United States Patent
Schneider et al.

(10) Patent No.: US 9,837,881 B2
(45) Date of Patent: Dec. 5, 2017

(54) METHOD FOR PRODUCING AN INDIVIDUAL-SEGMENT ROTOR FOR AN ELECTRIC MACHINE

(71) Applicant: SIEMENS AKTIENGESELLSCHAFT, München (DE)

(72) Inventors: Helmut Schneider, Bad Kissingen (DE); Armin Stäblein, Fladungen (DE); Benjamin Volkmuth, Sulzthal (DE)

(73) Assignee: SIEMENS AKTIENGESELLSCHAFT, München (DE)

( * ) Notice: Subject to any disclaimer, the term of this patent is extended or adjusted under 35 U.S.C. 154(b) by 236 days.

(21) Appl. No.: 14/784,603

(22) PCT Filed: Aug. 27, 2013

(86) PCT No.: PCT/EP2013/067658
§ 371 (c)(1),
(2) Date: Oct. 15, 2015

(87) PCT Pub. No.: WO2014/169973
PCT Pub. Date: Oct. 23, 2014

(65) Prior Publication Data
US 2016/0079832 A1    Mar. 17, 2016

(30) Foreign Application Priority Data
Apr. 16, 2013 (EP) .................................... 13163945

(51) Int. Cl.
*H02K 15/02* (2006.01)
*H02K 15/10* (2006.01)
(Continued)

(52) U.S. Cl.
CPC .......... *H02K 15/03* (2013.01); *H02K 1/2773* (2013.01); *H02K 3/51* (2013.01); *H02K 15/0006* (2013.01)

(58) Field of Classification Search
CPC ........ H02K 1/2773; H02K 3/51; H02K 15/03; H02K 15/0006
See application file for complete search history.

(56) References Cited

U.S. PATENT DOCUMENTS 3,191,270 A * 6/1965 Martin ..................... H02K 1/02
                                                          29/598
5,091,668 A * 2/1992 Cuenot ................ H02K 1/2773
                                                          310/156.61
(Continued)

FOREIGN PATENT DOCUMENTS

DE    198 46 924 A1    4/2000
DE    102 19 190 A1    11/2003
(Continued)

*Primary Examiner* — Paul D Kim
(74) *Attorney, Agent, or Firm* — Henry M. Feiereisen LLC

(57) ABSTRACT

In a method for producing an individual-segment rotor for an electric machine, a shaft is arranged in a mold and a plurality of laminated core segments, which are at a distance from one another, are arranged on the circumference of the shaft in a distributed manner in the mold. The laminated core segments each have a fixing contour for a form closure for radially fixing the laminated core segment on the shaft. In addition, a permanent magnet is arranged between each pair of laminated core segments. An intermediate space between the shaft and each fixing contour of the laminated core segments is filled with a curable nonmagnetic material. The curable nonmagnetic material forms a form closure with respect to the radial direction with each fixing contour, and therefore each laminated core segment is retained on the shaft by the form closure.

7 Claims, 7 Drawing Sheets

(51) Int. Cl.
*H02K 15/03* (2006.01)
*H02K 1/27* (2006.01)
H02K 3/51 (2006.01)
H02K 15/00 (2006.01)

(56) References Cited

U.S. PATENT DOCUMENTS

| | | | |
|---|---|---|---|
| 6,259,180 B1 * | 7/2001 | Pop, Sr. | H02K 1/2773 |
| | | | 29/598 |
| 8,853,894 B2 | 10/2014 | Vollmer | |
| 9,343,934 B2 * | 5/2016 | Zhao | H02K 1/2773 |
| 9,673,672 B2 * | 6/2017 | Pannier | H02K 1/2773 |
| 2006/0061227 A1 | 3/2006 | Heideman et al. | |
| 2012/0299429 A1 * | 11/2012 | Choi | H02K 1/2773 |
| | | | 310/156.12 |
| 2013/0127264 A1 | 5/2013 | Vollmer | |
| 2013/0127265 A1 | 5/2013 | Vollmer | |
| 2013/0241338 A1 * | 9/2013 | Mader | H02K 1/2773 |
| | | | 310/156.21 |

FOREIGN PATENT DOCUMENTS

| | | |
|---|---|---|
| EP | 1 100 175 A2 | 5/2001 |
| EP | 2 639 935 B1 | 3/2012 |

* cited by examiner

METHOD FOR PRODUCING AN INDIVIDUAL-SEGMENT ROTOR FOR AN ELECTRIC MACHINE

CROSS-REFERENCES TO RELATED APPLICATIONS

This application is the U.S. National Stage of International Application No. PCT/EP2013/067658, filed Aug. 27, 2013, which designated the United States and has been published as International Publication No. WO 2014/169973 and which claims the priority of European Patent Application, Serial No. 13163945.2, filed Sep. 13, 2006, pursuant to 35 U.S.C. 119(a)-(d).

BACKGROUND OF THE INVENTION

The present invention relates to a method for producing an individual-segment rotor for an electric machine. The present invention further relates to a corresponding individual-segment rotor.

Individual-segment rotors for electric motors with flux concentration are characterized in that the rotor is provided with permanent magnets arranged in a star-shaped manner and the intermediate space between the individual permanent magnets in each case is filled by a ferromagnetic individual segment. Such an individual segment is generally produced as a laminated core and therefore may be denoted as a laminated core segment. The individual laminated core segments are, if possible, not connected together.

The construction and production of an electric motor with magnets in flux concentration requires specific techniques. In particular, the construction should be scatter-resistant and suitable for mass production. Since a scatter-resistant construction generally requires the use of individual laminated segments, i.e. laminated core segments, and thus involves a higher production cost, such a construction hinders a mass production process.

Previous embodiments of corresponding rotors were a compromise between individual segments, on the one hand, and rotor laminations, on the other hand, which are connected together. With complete rotor laminations it is achieved that the laminated rotor core is able to be produced mechanically in a more stable and simple manner but a portion of the flux of the magnets is short-circuited. This is made possible, for example, by stamped and stacked rotor cores in which the inner separating bridges are kept at defined spacings. Individual segments as are disclosed, for example, in the post-published European patent application EP 12 159 917.9 provide the advantage that a short circuit is not produced. However, the number of components and thus the assembly and production cost increases.

Moreover, in an individual-segment rotor with flux concentration the rotor lamination has to be constructed separately by means of "non-magnetic" material (relative permeability $\mu_r$ less than 5) between each pole. This leads to a greater number of individual segments which have to be joined together. Problems occur here due to the complicated production of the individual segments and the complicated joining-together of the individual segments. Moreover, separate flux guidance has to be implemented by the non-magnetic material. Furthermore, problems occur with regard to the positioning and retention of the magnets and the torque transmission.

Previous embodiments were a compromise between individual segments and rotor laminations which are connected together. Thus it is achieved that the rotor core is able to be produced mechanically in a more stable and simple manner but a portion of the flux of the magnets is short-circuited. This is made possible, for example, by stamped and stacked rotor cores in which the inner separating bridges are always maintained.

SUMMARY OF THE INVENTION

The object of the present invention is to provide a method by which an individual-segment rotor for an electric machine may be produced at low cost.

According to the invention this object is achieved by a method for producing an individual-segment rotor for an electric machine by
- arranging a shaft in a mold,
- arranging a plurality of laminated core segments, which are respectively at a distance from one another, on the circumference of the shaft in a distributed manner in the mold, wherein the laminated core segments in each case have a fixing contour for a positive connection for radially fixing the laminated core segments on the shaft,
- arranging one respective permanent magnet between each pair of laminated core segments,
- filling an intermediate space between the shaft and each fixing contour of the laminated core segments with a curable non-magnetic material, so that
- the cured non-magnetic material forms a positive connection relative to the radial direction with each fixing contour and each laminated core segment is retained on the shaft thereby.

Moreover, according to the invention an individual-segment rotor is provided for an electric machine comprising
- a shaft,
- a plurality of laminated core segments distributed on the circumference of the shaft and in each case spaced apart from one another, and
- permanent magnets which in each case are arranged between two of the laminated core segments wherein
- the laminated core segments in each case have a fixing contour for a positive connection for radially fixing the laminated core segments on the shaft, and
- an intermediate space between the shaft and each fixing contour of the laminated core segments is filled with a curable non-magnetic material, so that
- the cured non-magnetic material forms a positive connection relative to the radial direction with each fixing contour and each laminated core segment is retained on the shaft thereby.

Advantageously, therefore, the laminated core segments are provided in each case with at least one fixing contour (for example an undercut, relative to the centrifugal force acting on the laminated core segments) and the intermediate space between the shaft and the laminated core segments is filled with a curable non-magnetic material (relative permeability $\mu_r$ less than 5). In each case a positive connection is produced between the cured non-magnetic material and the fixing contours, which holds the relevant laminated core segment on the shaft. By means of the filling step, therefore, all of the laminated core segments may be fixed to the shaft in one production step.

Preferably, the arrangement of the laminated core segments is such that a plurality of single-component annular laminations are arranged coaxially with the shaft, wherein each lamination comprises one respective individual lamination of each of the laminated core segments. As the individual laminations of the laminated core segments are initially connected together in one piece, they may be positioned easily in the mold.

If the individual laminations of all of the laminated core segments are connected together in one piece, each lamination may be closed on its outer circumference by first bridges before the filling process, wherein these first bridges are removed after the filling process. These first bridges may be particularly easily removed if they are located on the outer circumference of a lamination disk which contains the individual laminations.

Each lamination may have magnet recesses distributed on the circumference, magnet pockets being formed thereby between the laminated core segments and the permanent magnets being inserted therein. Thus the positions of the permanent magnets are automatically predetermined by the laminated core segments.

Moreover, each magnet recess on the side facing the center of the respective annular lamination may be closed by a second bridge, so that during the filling process the non-magnetic material does not flow into the magnet pockets and the second bridges may be removed after the filling process. As a result, non-magnetic material is prevented from penetrating the magnet pockets during the filling process. Alternatively, this may be achieved by corresponding sliding casting elements in the magnet pockets.

Moreover, the fixing contour may be produced with an undercut in the base of each laminated core segment which is oriented toward the shaft, said undercut counteracting the centrifugal force which acts on the respective laminated core segment during the rotation of the individual-segment rotor. As a result, the laminated core segments are fixed in the vicinity of the shaft at the base of the respective laminated core segment.

Moreover, a hollow space may be formed in each laminated core segment by corresponding recesses in the individual laminations of the laminated core segment, said hollow space being closed before the filling step on both front faces of the laminated core segment, or being filled with the non-magnetic material. The inertia of the rotor may be reduced by means of the hollow space. On the other hand, the hollow space may also be used for the additional fixing of the rotor and/or the individual laminations of the laminated core segments.

In one embodiment, a plurality of laminated core segments may be arranged axially one behind the other, in each case separated by a predetermined spacing in the mold, and the intermediate space produced by the spacing may then be filled during the filling process. As a result, a modular construction is produced in the axial direction, whereby stable rotors of greater axial length may also be produced.

A plastics material, in particular a fiber-reinforced plastics material, or aluminum may be used as non-magnetic material for the filling process. These materials are characterized by their low density and high strength. As a result, a more stable rotor may be produced with a low weight.

BRIEF DESCRIPTION OF THE DRAWING

The present invention is now described in more detail with reference to the accompanying drawings, in which.

DETAILED DESCRIPTION OF PREFERRED EMBODIMENTS

The exemplary embodiments described in more detail below represent preferred embodiments of the present invention.

Figure 1:
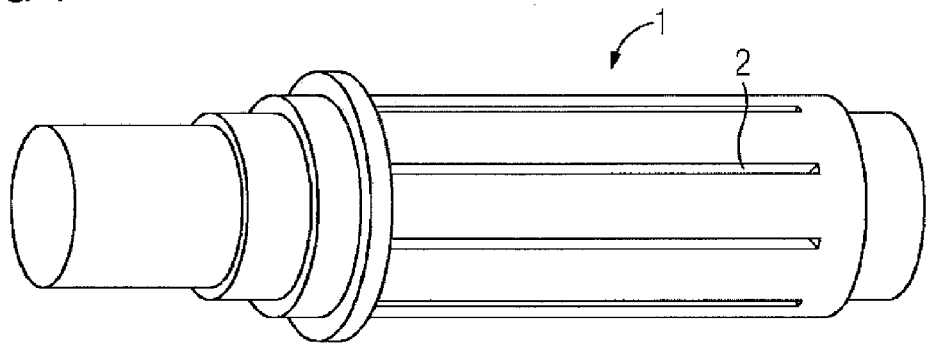
FIG. 1 shows a perspective view of a shaft for a rotor of an electric machine.

A shaft 1 which is suitable for producing an individual-segment rotor for an electric machine is shown in FIG. 1. The electric machine may be a motor or generator. It has in this case grooves 2 or further suitable means for torque transmission.

The shaft shown in FIG. 1 by way of example for the production of the individual-segment rotor is positioned in a mold. The mold is used for an injection-molding method. In the injection-molding method, plastics, in particular fiber-reinforced plastics, aluminum, or the like are partially injection-molded around the shaft 1. The mold with the positioning device is not shown in FIG. 1 or in the following figures.

Figure 2:
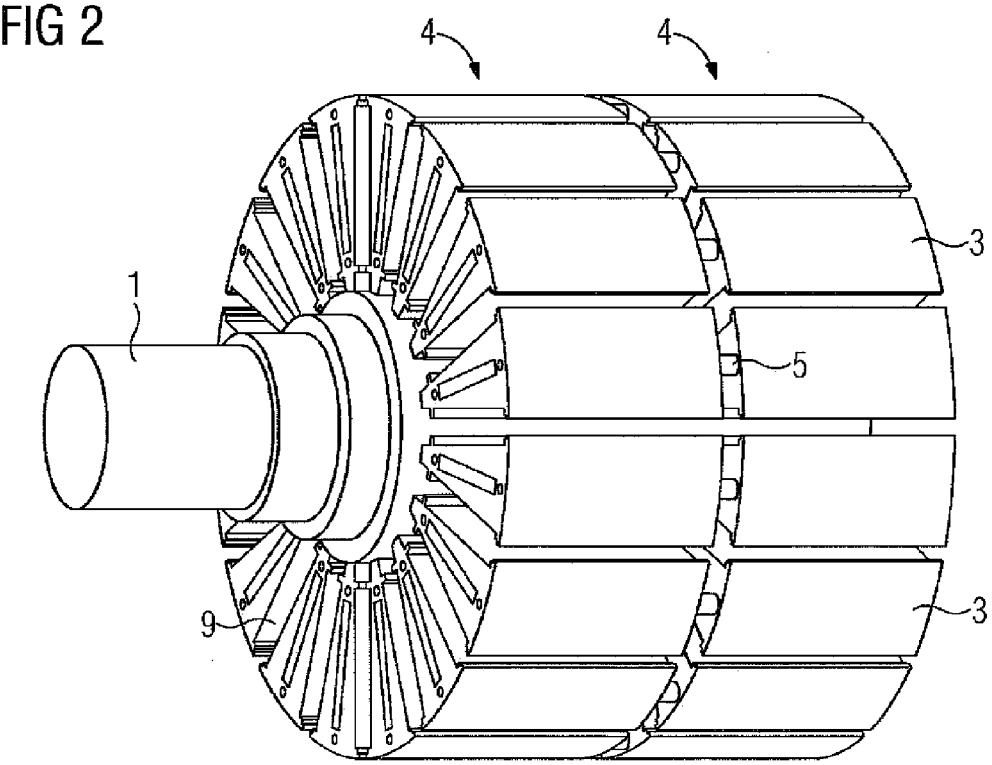
FIG. 2 shows laminated core segments positioned around the shaft of FIG. 1.
Figure 14:
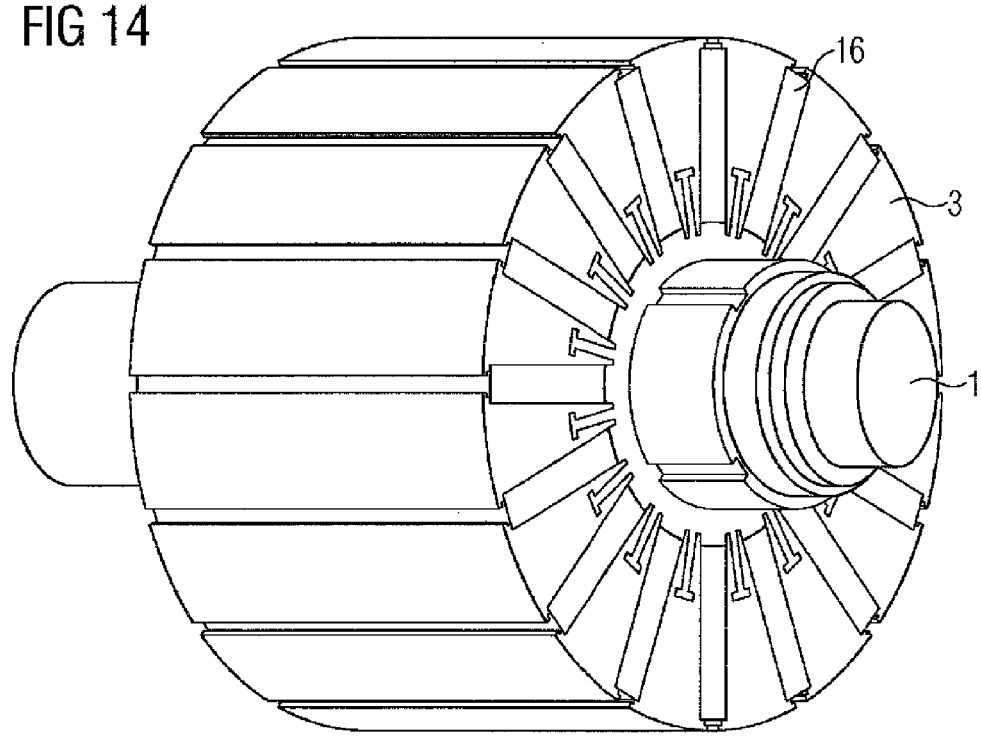
FIG. 14 shows the rotor of FIG. 13 in a perspective view.

FIG. 2 shows the shaft 1 about which numerous laminated core segments 3 are positioned in the mold, not shown. In this case, 16 laminated core segments are uniformly distributed on the circumference. Two laminated core segments 3 are arranged in each case one behind the other in the axial direction of the shaft. As a result, greater overall axial lengths of individual-segment rotors may be produced. In this manner, more than two laminated core segments may be arranged axially one behind the other. An individual-segment rotor is schematically shown in FIG. 14 with just one laminated core segment in the axial direction.

According to the example of FIG. 2, therefore, a modular construction results, with two laminated core segment rings 4 which are arranged axially one behind the other. An intermediate disk is intended to be formed between both laminated core segment rings 4 for stabilizing. Spacer sleeves 5 or other spacers between the two laminated core segment rings 4 provide the space required therefor in the mold. During the positioning of the laminated core segments 3, the spacer sleeves 5 are introduced at the same time into the mold.

Figure 3:
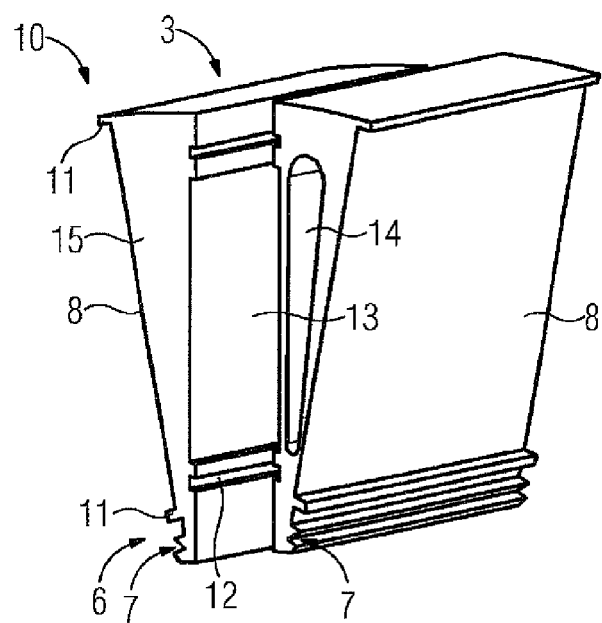
FIG. 3 shows an individual laminated core segment with a partial cut-away portion.

FIG. 3 shows an individual laminated core segment 3, a partial cutaway portion thereof being cut away on the front corner for a clearer view of its structure. Such a laminated core segment 3 has an approximately triangular cross section. The apex thereof forms the base 6 which faces the shaft 1. Fixing contours 7 are arranged at the base 6 on both sides of the center. In the present example, two grooves which extend in the axial direction are on each side. One undercut is produced for each groove, therefore, which permits a positive connection with the mold mass to be filled in and thus prevents the laminated core segment 3 from being disconnected from the shaft in the radial direction by centrifugal force.

The flanks 8 of each laminated core segment 3 represent the delimiting surfaces of magnet pockets 9 which in each case are formed by two laminated core segments 3 (see FIG. 2). Positioning aids 11 are arranged in the region of the base 6 and in the region of the top 10 of the laminated core segment 3 for the permanent magnets to be inserted. The positioning aids 11 in the region of the top 10 form a positive connection with the magnets to be inserted so that said magnets are prevented from slipping out in a radial direction.

Figure 6:
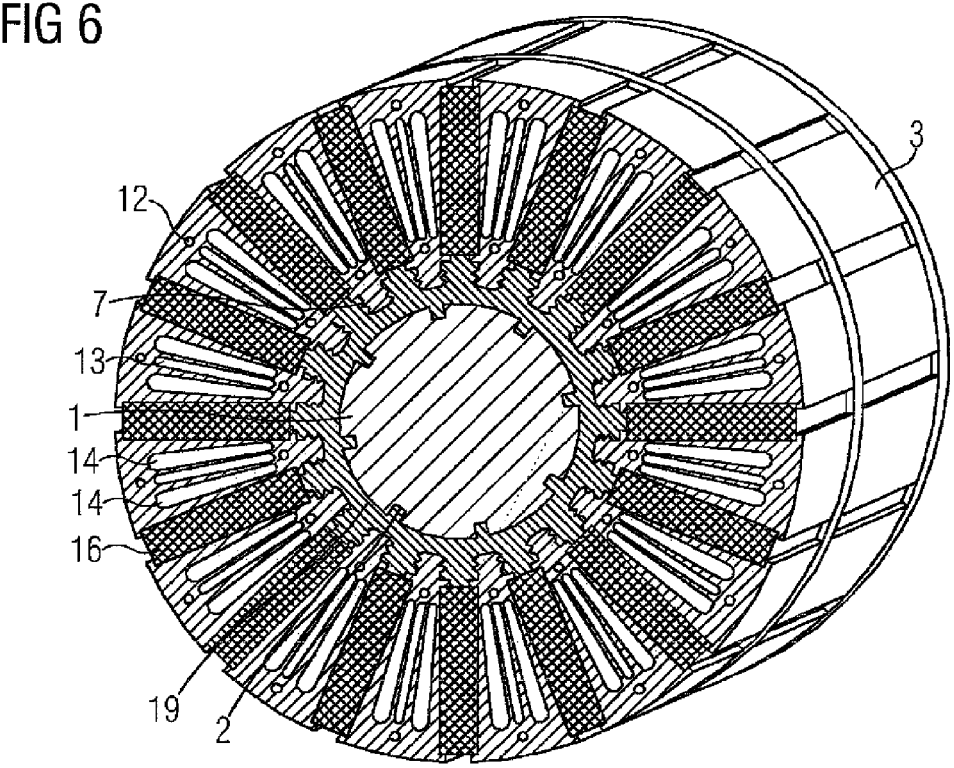
FIG. 6 shows a cross section through the rotor of FIG. 5.

One or more hollow spaces may be formed in a laminated core segment 3. In FIG. 2, only one hollow space 13 may be identified in each laminated core segment 3, apart from positioning holes 12. In the example of FIG. 3, a second hollow space 14 is indicated behind an end lamination 15. In the example of FIG. 6 it may be seen that in this case an individual lamination has an additional third hollow space. The individual hollow spaces are separated from one another. Such a hollow space may serve to insert a carrier in order to stabilize the laminated core segment and/or the rotor. For example, a carrier may be formed by the hollow space being filled with the non-magnetic material (relative permeability $\mu_r$ less than 5). In this case, the respective hollow space must not be closed by an end lamination 15 (see FIG. 2). The hollow space may, however, also be used in order to reduce the mass of the rotor and thus to reduce its inertia. In this case, it may be closed by the end lamination 15 (see FIG. 3).

Moreover, the laminated core segment 3 in this case has the aforementioned holes 12, one in the region of the base 6 and one in the region of the top 10 of the laminated core segment 3. These holes 12 serve for positioning the laminated core segments in the mold and, for example, for joining the spacer sleeves 5.

Figure 4:
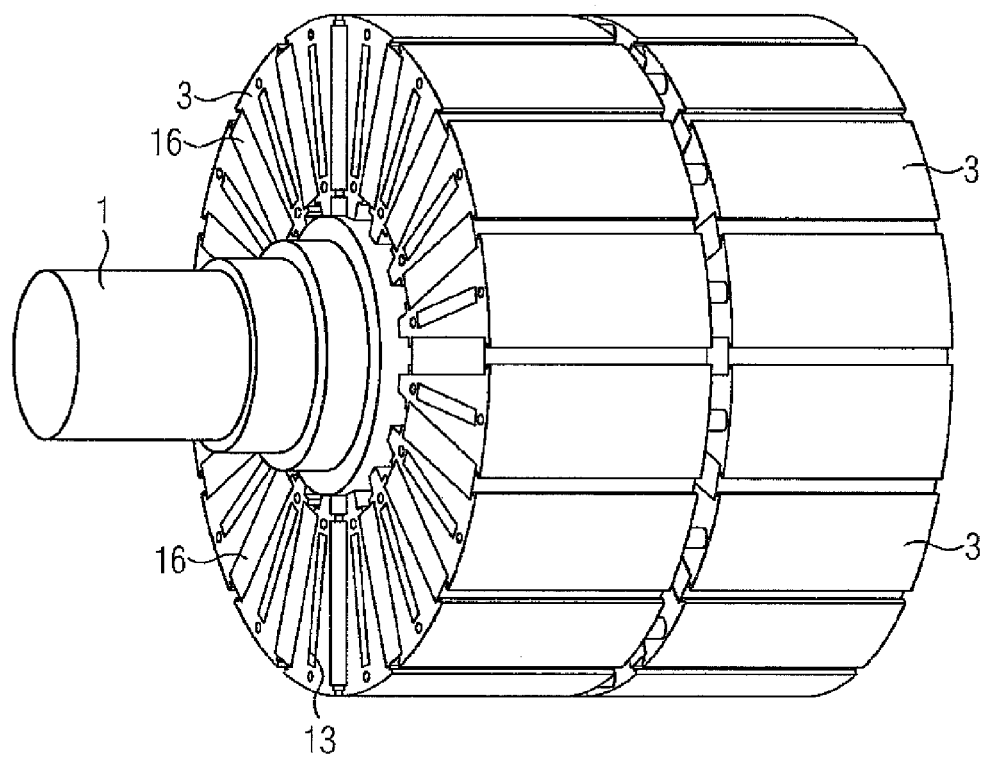
FIG. 4 shows the arrangement of FIG. 2 with the inserted permanent magnets.

In FIG. 4 the arrangement of FIG. 2 is shown, wherein permanent magnets 16 which have the same axial length as the individual laminated core segments 3 are inserted in the magnet pockets 9. The permanent magnets 16 may be reliably positioned via the joining aids 11 between the laminated core segments 3.

For the following injection-molding process, the open hollow spaces 13 on the front faces of the individual laminated cores 3 may be filled with the corresponding mold mass, which then forms the corresponding carrier. Alternatively, the hollow spaces 13 may also be filled with steel or a different mold mass (for example carbon fiber-reinforced plastics or foam). By this process, the rotor may be modified further to its requirements.

After all of the components have been positioned in the mold, the tool is closed and the mold mass (plastics, aluminum, fiber-reinforced plastics, etc.) introduced. This fills up the hollow spaces and thus forms a solid composite which holds the rotor together.

Figure 5:
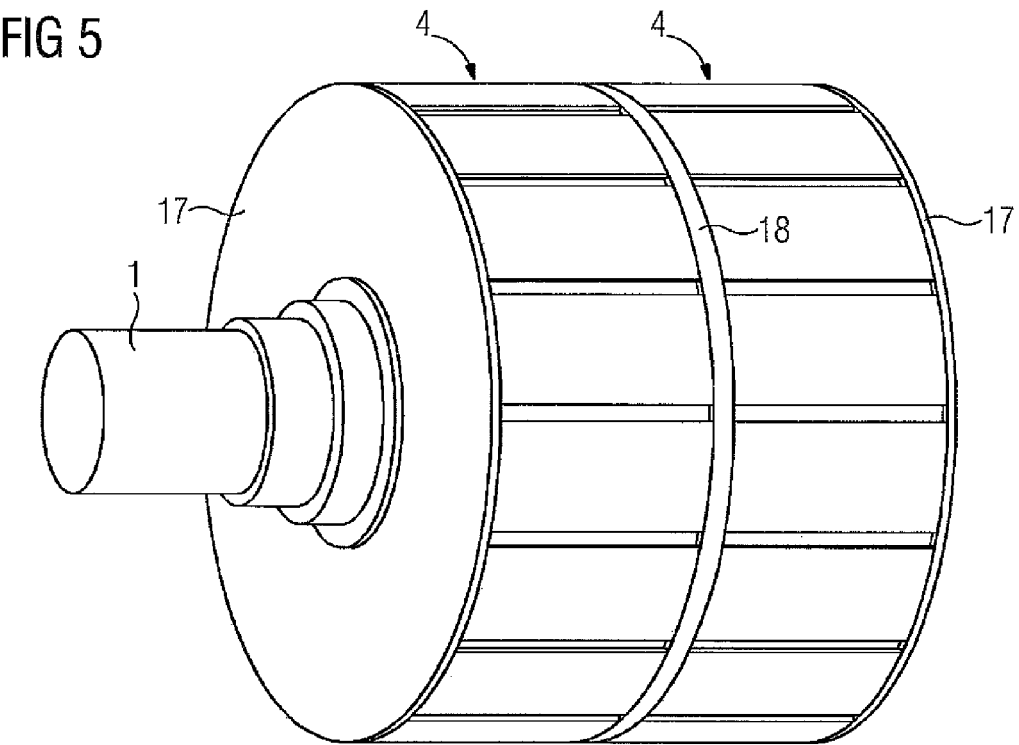
FIG. 5 shows the arrangement of FIG. 4 after filling with non-magnetic material.

FIG. 5 now shows the finished individual-segment rotor after injection-molding. End plates 17 are formed on the front faces of the rotor by the mold mass. The gap between the two laminated core segment rings 4 is filled by a separating plate 18 which also consists of the mold mass.

Figure 7:
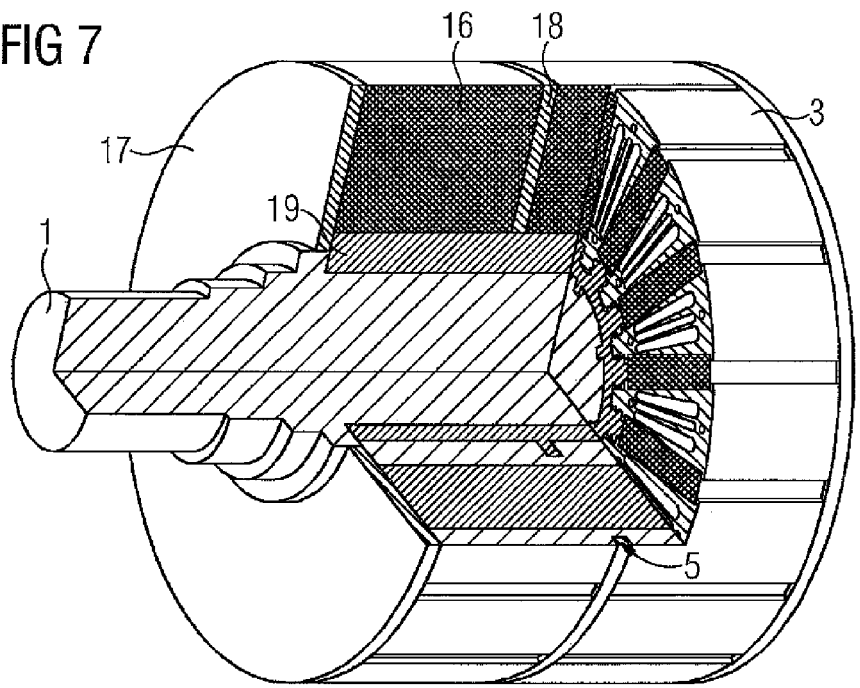
FIG. 7 shows the rotor of FIG. 5 with a partial cutaway portion.

A cross section through the finished individual-segment rotor of FIG. 5 is shown in FIG. 6 and in FIG. 7 the rotor is shown with a partial cutaway portion. In particular, it may be derived from FIG. 6 how the fixing contours 7 are enclosed by the mold mass 19 which also forms a ring and/or inner sleeve 19 about the shaft 1 provided with grooves 2. The closed hollow spaces 14 are not filled with the mold mass, while the hollow spaces 13 which are open during the injection-molding process are now filled with the mold mass. Moreover, the end plates 17 and the separating plate 18 are also formed from the mold mass.

In this first exemplary embodiment, therefore, individual laminated segments and/or laminated core segments 3 are used for achieving a scatter-resistant construction.

FIGS. 8 to 14 show a simplified production method for an individual-segment rotor. To this end, according to FIG. 8, individual annular laminations with corresponding stamped portions are used. Such a lamination 20 has, for example, the contour shown in FIG. 8. The same contour is produced for the entire blank laminated core in the manner in which it is positioned together with the shaft 1 in the mold. One respective individual lamination of all of the laminated core segments 3 arranged on the circumference is part of the single-component lamination 20. The individual laminations are connected in pairs to first bridges 21 on the outer circumference of the annular lamination 20. Moreover, they are connected in pairs on the side of the lamination 20 facing the center of the annular lamination 20, i.e. toward the axis of the shaft 1, via a second bridge 22. Two adjacent individual laminations are thus connected to a first bridge 21 and to a second bridge 22. Thus all laminated core segments 3 are connected in an annular manner together. Here the magnet pockets 9 are also formed between the bridges 21 and 22.

In the present exemplary embodiment, the fixing contours 23 required for fixing the laminated core segments 3 are not arranged externally on the respective laminated core segments 3 but in the interior thereof. The fixing contours 23 have in this case a T-shaped cross section and they also form an undercut for the mold mass to be introduced so that a positive connection is achieved by which the laminated core segments 3 are retained on the shaft 1. The base of the "T" shape of all of the fixing contours 23 faces toward the axis of the shaft 1.

Figure 8:
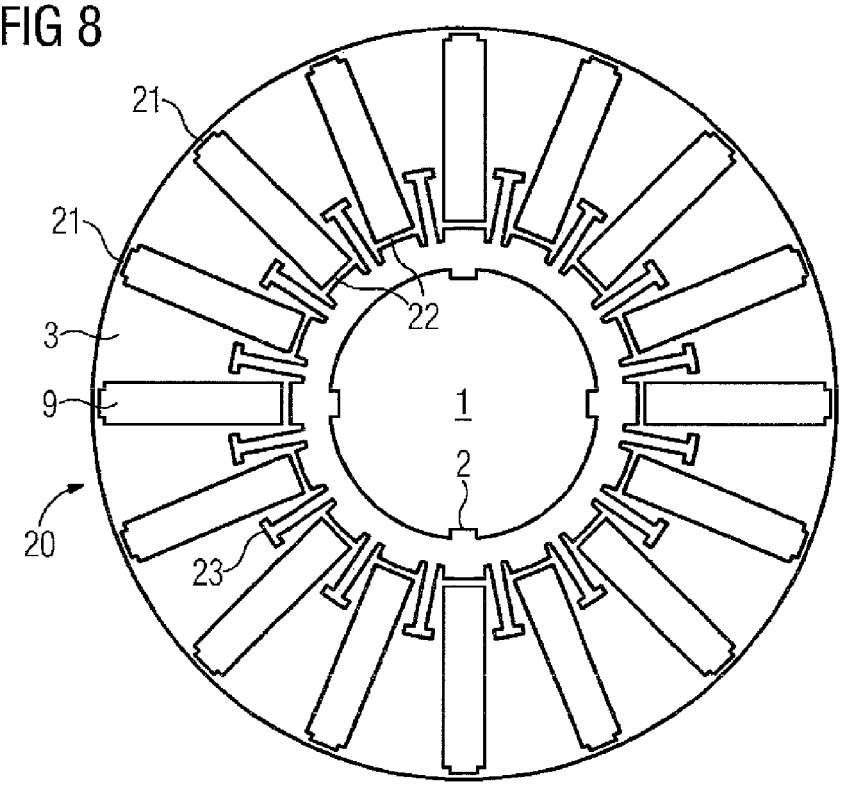
FIG. 8 shows a single-component lamination with individual laminations joined together for each laminated core segment arranged on the circumference.
Figure 9:
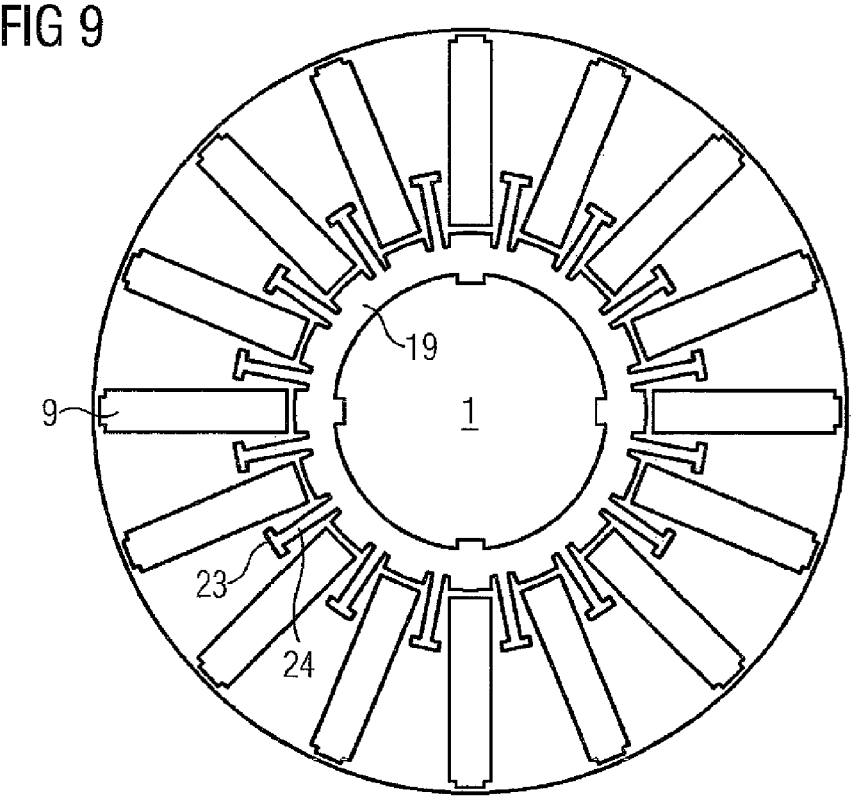
FIG. 9 shows a front side view of a rotor produced with laminations according to FIG. 8 after filling with non-magnetic material.

FIG. 9 now shows the arrangement of FIG. 8 after the filling process. The intermediate space between the shaft 1 and the inner face of the entire laminated core is filled and forms the inner sleeve 19. The filling and/or mold mass is in turn non-magnetic and as in the previous exemplary embodiment made of aluminum, stainless steel, plastics or the like. The fixing contours 23 are also filled with the mold mass, as they are open toward the shaft. Thus the inner sleeve 19 has corresponding projections 24 which protrude into the fixing contours 23 and produce the positive connection.

Figure 10:
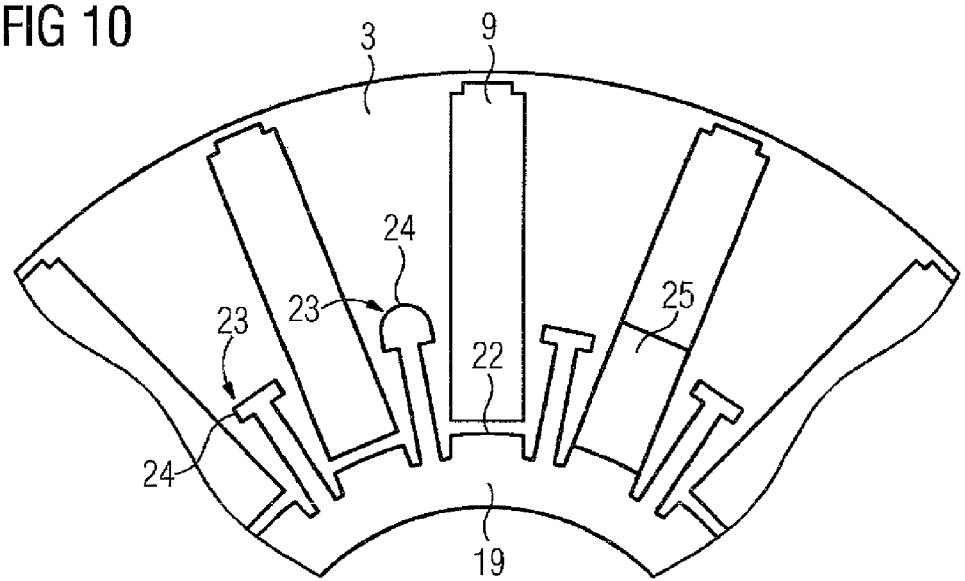
FIG. 10 shows an enlarged detail of FIG. 9 with variants.

As may be seen in the enlarged view of FIG. 10, the second bridges 22 prevent the mold mass from penetrating the magnet pockets 9. In an alternative embodiment, however, the second bridges 22 are dispensed with, which is why sliding casting elements 25 are required in the magnet pockets 9 in order to keep the mold mass out of the magnet pockets 9. In this case, as in the previous exemplary embodiments, both pressure die-casting and permanent mold casting are possible as casting methods. If material is not simultaneously filled in around the shaft during this processing step, the shaft has to be connected to the rotor core by cold joining, for example, at a later time.

It is also revealed from FIG. 10 that the fixing contours 23 may not only have a T-shaped cross section. Instead, they may also have, for example, a mushroom-shaped cross section or other cross section. It is only essential for at least one undercut to be present for the radial fixing of the respective laminated core segment 3.

Figure 11:
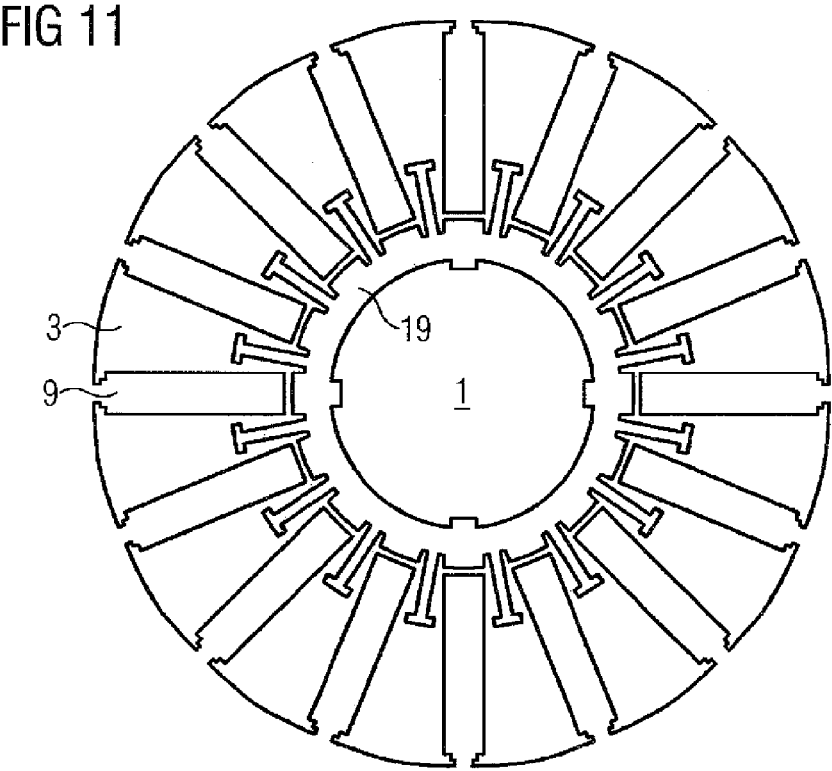
FIG. 11 shows the rotor of FIG. 9 with the first bridges removed.

In a further processing step, the opening of the outer, i.e. the first, bridges 21 of the lamination section takes place by a turning and/or milling process. The result is shown in FIG. 11. The processing of the outer circumference has the advantage that, as a result, the required air gap between the rotor and the stator may be accurate and also small, therefore. The first bridges 21 may be opened immediately as a result of the turning process. Alternatively, the outer diameter is initially machined by turning and subsequently the outer bridges opened by a milling process. After this machining step the laminated core segments 3 are already separated from one another externally.

Figure 12:
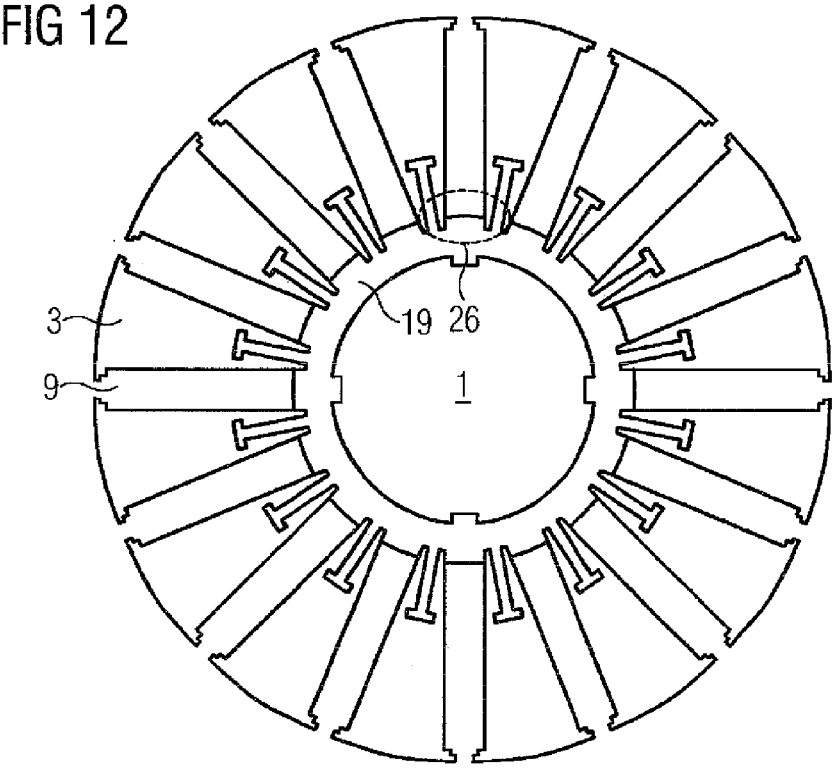
FIG. 12 shows the rotor of FIG. 11 with the second bridges removed.

FIG. 12 shows the result of the next machining step in which the inner, i.e. the second, bridges 22 are removed. The circle 26 in dashed lines indicates that the second bridge 22 has been removed. The removal of the second bridge 22 in each magnet pocket 9 and the accurate definition of the magnet seat may be carried out by a milling operation.

Figure 13:
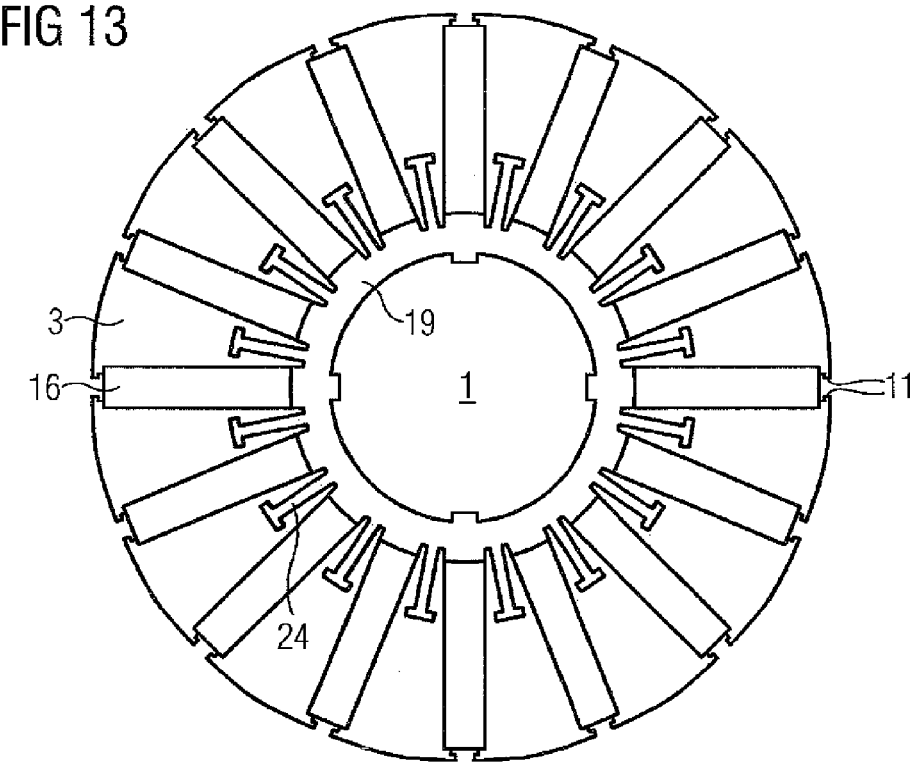
FIG. 13 shows the rotor of FIG. 12 in the final state with the inserted permanent magnets.

In a subsequent step according to FIG. 13 the permanent magnets 16 are introduced into the magnet pockets 9. The magnets 16 are retained radially outwardly by the positioning aids 11 which, therefore, form a positive connection with the magnets 16.

FIG. 14 shows the individual-segment rotor in its final phase after production. Together with FIG. 13 it may be seen clearly that the extensions 24 on the inner ring 19 fix the laminated core segments 3 to the shaft 1. The laminated core segments in turn fix the permanent magnets 16 radially and in the peripheral direction.

In this second embodiment, therefore, the rotor core is produced by single-component rotor laminations being used from the start. During the course of the individual machining steps, a rotor which fulfills all requirements is produced. In particular, the arrangement of the magnets permits optimal flux guidance according to the flux concentration principle. Moreover, an accurate external diameter and thus a very small air gap may be produced in the motor as in practice the tolerance chain only consists of one part. The reduction in the number of rotor parts results in a simple assembly and thus a mass production method.

The invention claimed is:

1. A method for producing an individual-segment rotor for an electric machine, comprising:
arranging a shaft in a mold;
arranging a plurality of laminated core segments at a distance from one another on a circumference of the shaft in the mold, such that a plurality of single-component annular laminations are arranged coaxially with the shaft, with each lamination comprising an individual lamination of each of the laminated core segments, with the laminated core segments having each a fixing contour for a positive connection for radially fixing the laminated core segments on the shaft;
forming each annular lamination of the plurality of single-component annular laminations with magnet recesses distributed on a circumference to define magnet pockets between adjacent ones of the laminated core segments, with each annular lamination being closed on an outer circumference by first bridges, and with the magnet recesses on a side facing a center of the annular lamination being closed by second bridges;
inserting a permanent magnet in each of the magnet pockets between the laminated core segments;
filling an intermediate space between the shaft and each fixing contour of the laminated core segments with a curable non-magnetic material, so that the cured non-magnetic material forms a positive connection relative to a radial direction with each fixing contour and thereby retaining the laminated core segments on the shaft in the absence of any non-magnetic material flowing into the magnet pockets as a result of the presence of the second bridges; and
removing the first and second bridges after the filling process.

2. The method of claim 1, wherein the fixing contour is produced with an undercut in a base of each laminated core segment, which base is oriented toward the shaft, to counteract a centrifugal force which acts on the laminated core segment during the rotation of the individual-segment rotor.

3. The method of claim 1, further comprising forming a hollow space in each laminated core segment by providing corresponding recesses in the individual laminations of the laminated core segment, and closing the hollow space before the filling process on both front faces of the laminated core segment.

4. The method of claim 1, further comprising forming a hollow space in each laminated core segment by providing corresponding recesses in the individual laminations of the laminated core segment, and filling the hollow space with the non-magnetic material during the filling process.

5. The method of claim 1, further comprising arranging a plurality of laminated core segments axially one behind the other at a predetermined spacing in the mold to define a further intermediate space, and filling the further intermediate space during the filling process.

6. The method of claim 1, wherein the non-magnetic material is a plastics material or aluminum.

7. The method of claim 6, wherein the plastics material is a fiber-reinforced plastics material.

* * * * *